Patented Aug. 13, 1946

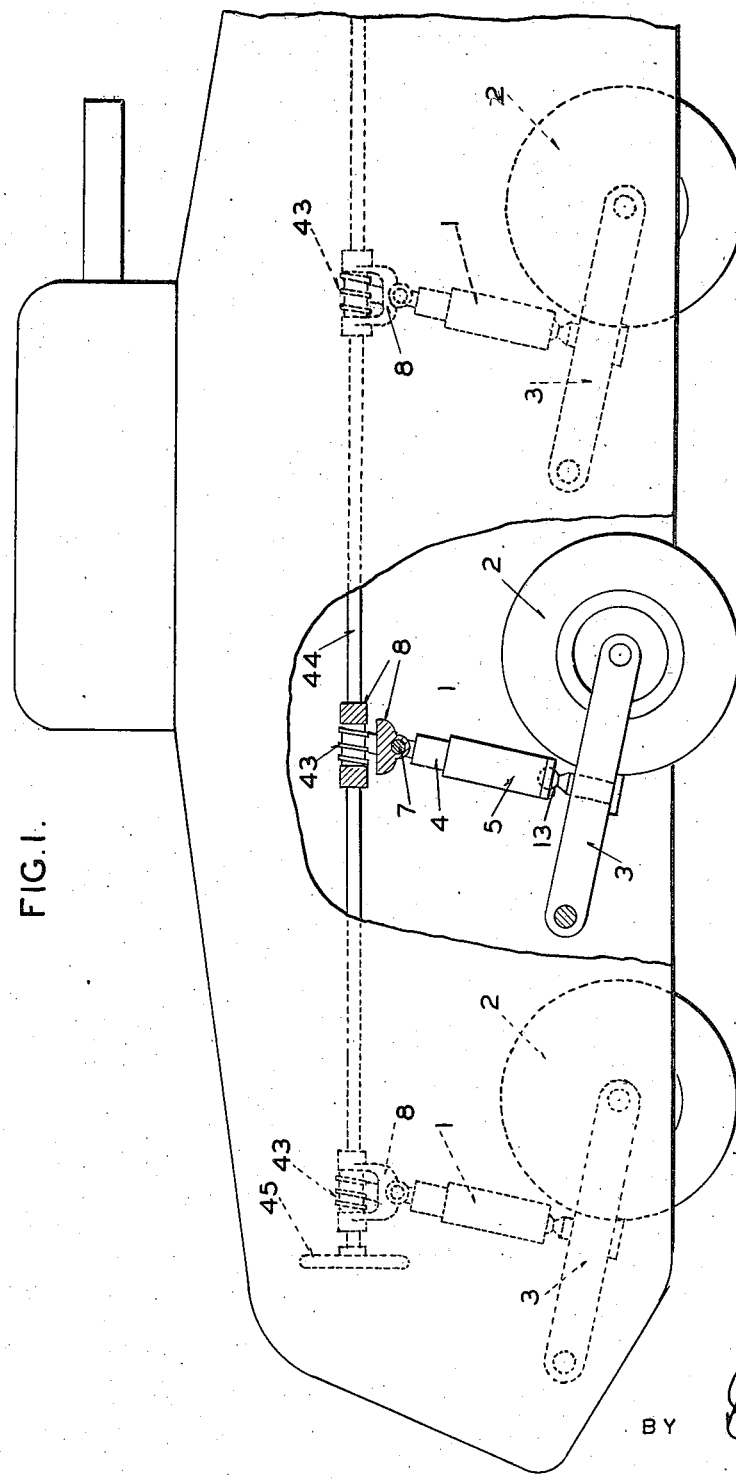

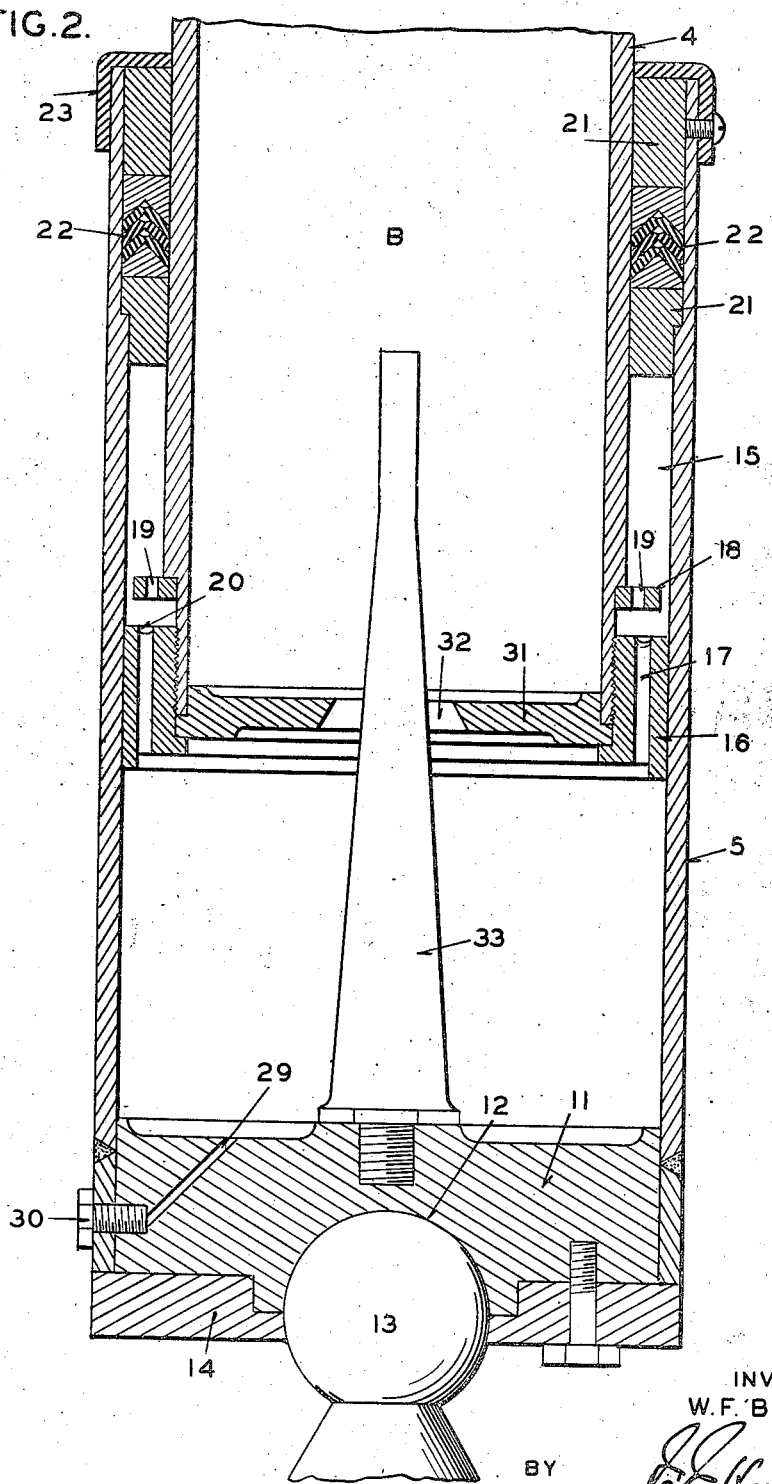

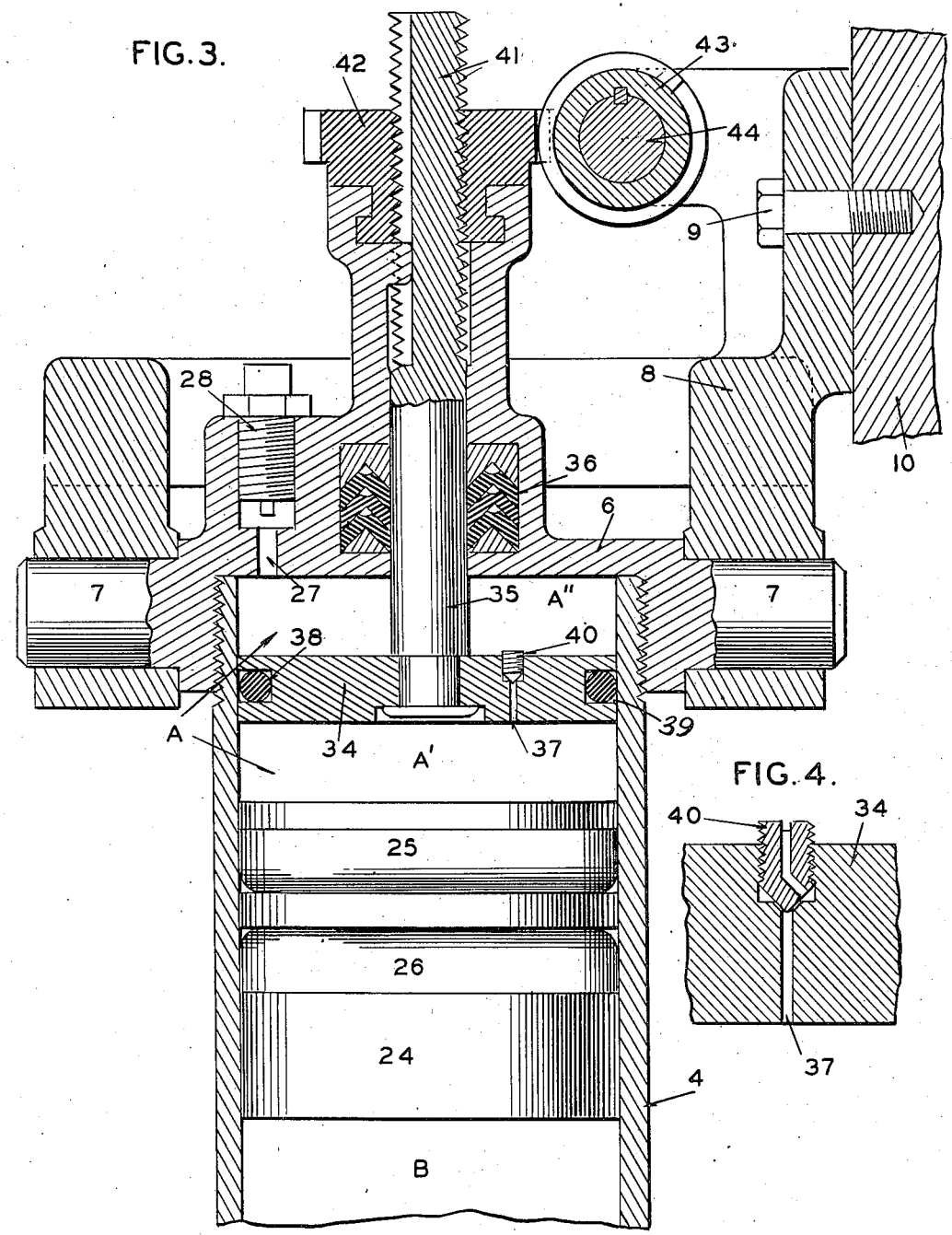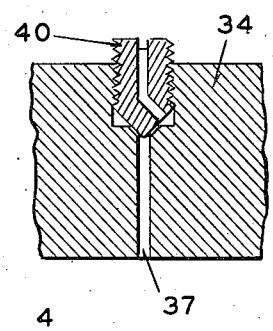

2,405,733

UNITED STATES PATENT OFFICE 2,405,733

VARIABLE PNEUMATIC DAMPENER FOR STRUTS

Werner F. Boldt, Clayton, Mo., assignor to Wagner Electric Corporation, St. Louis, Mo., a corporation of Delaware Application February 20, 1943, Serial No. 476,608

5 Claims. (Cl. 267—64)

1

My invention relates to yieldable devices of the type employing relatively movable members containing a gas, such as air, and a liquid, both of which are under pressure and more particularly to a control means for varying the effective volume of the gas acted upon by the liquid under certain conditions of operation.

One of the objects of my invention is to so associate with a yieldable device of the type referred to, means whereby the effective volume of gas or air being employed during operation of the device, may be varied at will to suit varying operating conditions.

Another object of my invention is to provide a single control means for permitting the simultaneous controlling at will and in a like manner of the variable effective volume means associated with each of a plurality of yieldable devices.

Still another object of my invention is to provide means in a yieldable device of the type referred to for establishing two chambers of gas or air which will be automatically effective to dampen oscillations of the yieldable device in a variable manner depending upon the load conditions imposed on said device.

Other objects of my invention will become apparent from the following description taken in connection with the accompanying drawings in which Figure 1 is a view of one side of a vehicle employing yieldable devices as struts for the suspension of the wheels, said devices having means embodying my invention whereby the operating characteristics thereof may be simultaneously controllable at will; Figures 2 and 3 are longitudinal sectional views showing details of construction of one of the struts, Figure 2 being the lower portion of the strut and Figure 3 the upper portion; and Figure 4 is an enlarged sectional view showing the adjusting means for the piston passage.

Referring to the drawings in detail, in Figure 1 I have shown my improved yieldable device 1 employed as a suspension strut between each wheel of a vehicle and the chassis or body thereof. However, this is by way of example only since the device may be used wherever it is desirable to have a yieldable support, a suspension device, a rebound control device, a shock absorbing device, and so forth. As shown in Figure 1, each wheel 2 is rotatable on the end of an arm 3 pivotally mounted on the chassis. Between each arm and the chassis is the strut 1.

As best shown in Figures 2 and 3, the yieldable device or strut is composed primarily of two telescoping cylinders 4 and 5, the former or inner

2 cylinder being closed at its upper end by a cap 6 carrying trunnions 7 which are mounted in a trunnion mounting member 8 secured by bolts 9 to a member 10 forming a part of the body of the vehicle. The lower or outer cylinder 5 is closed by a cap 11 which is provided with a socket 12 for receiving the ball 13 carried on arm 3 connecting the body of the vehicle and the wheel. The ball is held in the socket by a plate 14.

The external diameter of cylinder 4 is somewhat less than the internal diameter of cylinder 5, thus producing a chamber 15 between the walls of the two cylinders. The lower end of cylinder 4, which is received in cylinder 5, carries a sleeve 16 which has such an external diameter as to snugly fit into cylinder 5 in order to properly guide the lower end of cylinder 4. This sleeve is provided with a plurality of circumferentially spaced passages 17 for placing chamber 15 in communication with the interior of cylinder 5 below the sleeve. Cooperating with the upper side of this sleeve is a ring 18 having holes 19, said holes being considerably fewer in number than passages 17 in the sleeve. Thus this ring controls the flow of fluid out of chamber 15 whenever cylinders 4 and 5 move relatively outwardly with respect to each other. Under these conditions the ring must seat on the top of the sleeve and all fluid must flow through the openings in the ring. However, the ring will have no effect in controlling the flow of fluid through passages 17 when cylinder 4 moves inwardly with respect to cylinder 5 since under these conditions the fluid flowing through the numerous passages 17 will lift the ring off the sleeve and then flow freely around the ring. The ring is shown in an unseated position engaged with a shoulder formed on cylinder 4 which limits its unseating movement. An annular groove 20 connects the upper end of all the passages 17.

The upper end of cylinder 5 carries bearing sleeves 21 between which is interposed suitable annular packing means 22 to prevent fluid from leaking past the two cylinders yet permitting the cylinders to have relative axial movement. The bearing sleeves and packing means are held in position by a retaining cap 23 secured to the upper end of cylinder 5.

Within cylinder 4 is a piston 24 dividing the space within the two cylinders into an upper chamber A and a lower chamber B, the former being solely within cylinder 4 and the latter within the lower part of cylnder 4 and cylinder 5, said chamber B also including chamber 15 between the walls of the cylinders. The piston carries packing cups 25 and 26 to prevent fluid from leaking past the piston periphery in either direction, thus eliminating any possibility of the fluids in the chambers becoming mixed. Chamber B is filled with non-compressible fluid such as oil or hydraulic brake fluid and chamber A is filled with a compressible fluid or gas, preferably air under pressure. Air is admitted into chamber A through an inlet 27 in cap 6 which is controlled by an air pressure check valve 28. The non-compressible fluid is admitted into chamber B through a passage 29 in cap 11 when the closure plug 30 is removed.

In the strut structure there is also provided a wall 31 at the lower end of cylinder 4 held in position by sleeve 16. This wall has an opening 32 and extending therethrough is a tapered pin 33 carried by and extending upwardly from cap 11.

When chamber B is filled with liquid and chamber A is filled with air under pressure, the yieldable device or strut will be in operative condition. Under these conditions the pressures in both chambers are the same since the piston only acts as a movable separating wall to prevent mixing of the air and liquid. As the device operates when the vehicle moves and the wheel passes over uneven surfaces, cylinders 4 and 5 will move relatively to each other both in an inward and an outward direction. As cylinder 4 moves inwardly with respect to cylinder 5, piston 24 will be forced upwardly, thus placing the air in chamber A under additional pressure since the volume thereof will be decreased. In Figure 3 the piston 24 is shown at the upper end of cylinder 4, a position it will assume when there has been an extremely heavy load imposed on the strut. When cylinder 4 moves outwardly with respect to cylinder 5, piston 24 will move downwardly with respect to cylinder 4 and the volume of chamber A will increase and the air therein will expand. Since the air in chamber A is compressible, it will act as a cushioning means between the wheel and the frame of the vehicle and thus absorb road shocks.

Whenever there is a momentary large force effective on the strut, as when the vehicle wheel encounters a large obstruction or goes over an embankment, the tapered pin 33 and opening 32 are effective to control the rate of flow of liquid from cylinder 5 to cylinder 4 as they move toward each other. It is seen that as this relative movement takes place, the area of opening 32 will be decreased. By decreasing the rate of flow, the downward movement of cylinder 4 will be checked or slowed up and the full force of impact on the strut will become slowly effective on the piston and the air in chamber A instead of instantaneously fully effective. Thus means are provided to slowly absorb the impact force.

The means provided for preventing too rapid separating movement of cylinders 4 and 5 when the wheel passes over a depression is the previously described passages 17 and ring 18 acting to control the flow of liquid from chamber 15. During relative downward movement of cylinder 4, liquid will flow freely into the expanding chamber 15. However, when the cylinders move outwardly relatively to each other, the flow of fluid out of chamber 15 will be slow as it must be through the few holes 19 in ring 18. Thus rapid separation movement of the cylinder will be checked.

Under changing temperature conditions and also changing impact conditions (such as different roughness of highways or other surfaces) it is desirable to change the effective volume of the air in chamber A which is acted upon by the piston 24. By changing this effective volume, the strut can be made to act as a variable suspension means and give proper suspension of the vehicle under the changing conditions. The varying of the effective volume of chamber A is accomplished by providing a piston 34 in the upper end of cylinder 4, which piston has a piston rod 35 secured thereto and extending through cap 6. The rod is sealed to the cap by suitable packing means 36 which permits it to reciprocate in the cap. The piston is provided with a small passage 37 between its faces in order that the portions of chamber A on both sides of the piston may be in constant communication. Thus the piston divides chamber A into two compartments A' and A". In order to insure that all interchange of fluid between these two compartments is through small passage 37, the piston is sealed with the cylinder wall by a suitable annular O-ring 38 carried in a groove 39.

By the use of this piston it is seen that when the strut is under its normal load condition, the pressure of the air in compartments A' and A" will be the same. If the wheels of the vehicle should move over a reasonably smooth surface, piston 24 will be caused to have only slight vibrations or oscillations in the cylinder 4 and under these conditions all the air in the two compartments will be substantially fully acted upon by the piston as the rate of increase or decrease of the pressure of the air in compartment A' will not be so great that it cannot also be substantially the same as compartment A" due to passage 37. However, if there should be an extremely heavy load imposed on the strut as when encountering a large obstruction or a rough surface, the rate of increase of the air pressure in the lower compartment A' will be greater than the rate of increase of the air pressure in compartment A" since passage 37 is not large enough that the increase can take place simultaneously in both compartments. Thus when it is desired to have a smaller volume of air under pressure acted upon by the piston 24 and the liquid, the normal volume of compartment A' should be decreased. This will result in the strut acting as a "stiffer" suspension means. When it is desired to have the strut act as a "softer" suspension means, then the normal volume of compartment A' should be increased. This is accomplished by moving the piston upwardly.

It is to be noted in this arragement that when a load greater than normal is placed on the strut, it is immediately followed by a load less than normal due to the rebound as the wheel passes over the obstruction. The time interval that the greater load is effective is so small that the upper compartment A" will not have sufficient time to become equalized with the pressure built up in the lower compartment A'. When the volume of the compartment A' is small, the force acting on the piston and the fluid after the momentary force greater than normal has acted will also be less due to the fact that there is not as large a volume of air which can expand rapidly. Thus the "stiffer" action of the strut will be maintained under both application of the load and the rebound. When the volume of compartment A' is increased, there will be a greater volume of air to expand, and, therefore, the "softer" action of the strut will be maintained during the rebound.

The cross-sectional area of passage 37 through which air may interchange between the subchambers can be made adjustable by means of a suitable adjusting screw 40 (see Figure 4). This permits change in the rate of increase of the air in compartment A' for any setting of the piston.

In order that the piston 34 may be readily moved to any desired position to vary the volume of compartments A' and A", the outer end of piston rod 35 is provided with threads 41 for receiving the threaded gear 42 journaled against any axial movement of the upper end of cap 6. The gear 42 is rotated by a worm 43 which is secured to a control shaft 44 suitably journaled in the trunnion mounting member 8. As best shown in Figure 1, the control shaft 44 extends the entire length of the vehicle so that all the pistons 34 of the struts on one side of the vehicle may be adjusted simultaneously. The worms 43 are spaced as required on the control shaft. A small wheel 45 is shown mounted on one end of the shaft for rotating it.

In making the initial adjustment of piston 34 in cylinder 4, it will not be necessary that each piston of each strut have the same position since if it is desired to have stiffer struts at the rear of the vehicle than at the front, pistons 34 for the rear struts will be positioned to have an original position which causes a smaller volume for compartment A' than would be the case of the pistons for the front struts. The movement of each strut, however, would be the same when the control shaft is moved and the relative "stiffness" or "softness" of the struts will be maintained for any adjusted position of the control shaft. The ability to vary, as desired, the cross-sectional area of each passage 37 in pistons 34 and to also change the relative original positioning of the pistons 34 in their cylinders permits the vehicle to be given proper suspension for varying conditions encountered during driving.

Having fully described my invention, what I claim as new and desire to secure by Letters Patent of the United States is:

1. In a device of the class described, two members capable of relative movement and so constructed as to form a variable chamber, a substantially non-compressible fluid and a compressible fluid in the chamber, said compressible fluid being under pressure and free to act on the non-compressible fluid to place it under an equal pressure, means comprising a partition member having a restricted passage therethrough and being carried by one of said members for dividing the compressible fluid and establishing a compartment for a portion of the compressible fluid, said compartment being such as not to have its volume varied when the volume of the chamber formed by the members and containing the two fluids is rapidly varied, and means for moving the partition member at will to vary the volume of said compartment.

2. In a device of the class described, a chambered member, a relatively movable cylinder having an open end extending into the chamber of the member, a piston in the cylinder forming a movable partition, a compressible fluid under pressure on one side of the piston and a non-compressible fluid on the other side of the piston, means for varying the effective volume of compressible fluid acted upon and compressed by the piston when caused to move relatively to the cylinder as a result of momentary forces so acting on the cylinder and member as to cause them to move rapidly toward each other, said means comprising a partition for dividing the compressible fluid and establishing a compartment for containing a predetermined volume of compressible fluid, means permitting restricted flow of compressible fluid to the compartment from the body of compressed fluid directly acted upon by the piston, and means for moving the partition to vary the volume of the compartment at will.

3. In a device of the class described, two telescoping cylinders having closed outer ends and communicating inner ends and being subjected to momentary forces causing them to move rapidly toward each other, a piston in one cylinder dividing the cylinders into two chambers, compressible fluid under presure in one chamber, a non-compressible fluid in the other chamber, a second piston dividing the compressible fluid containing chamber into two compartments, said second piston being provided with a passage of small cross-sectional area permitting intercommunication between the compartments, and means for adjusting the second piston with respect to the wall of the cylinder in which it is positioned to thereby vary the volume of the compressible fluid which can be directly acted upon by the first named piston.

4. In a device of the class described, two telescoping cylinders having closed outer ends and being subjected to such momentary forces as to cause them to move rapidly toward each other, a movable wall dividing the cylinders into two chambers, a compressible fluid under pressure in one chamber, a non-compressible fluid in the other chamber, a piston associated with one cylinder and dividing the chamber containing the non-compressible fluid into two compartments, said piston having a restricted passage through its body, means for adjusting the piston with respect to the cylinder wall with which it is associated and comprising a piston rod extending to the exterior of the cylinder with which the piston is associated and being provided with screw threads, and a nut cooperating with the threads of the rod and mounted for rotative movement only on said cylinder.

5. In combination with a vehicle body and a plurality of wheels therefor, strut devices for suspending the body on at least two of the wheels, each of said devices comprising a chambered member, a relatively movable cylinder having an open end extending into the chamber of the member, a movable wall dividing the chamber of the member and the cylinder into two chambers, a compressible fluid under pressure in one of said two last named chambers, a non-compressible fluid in the other of said two last named chambers, said compressible fluid being in at least a portion of the cylinder, a piston in the cylinder for establishing two compartments for the compressible fluid, said piston having a restricted passage placing the two compartments in communication with each other, and means exterior to the strut devices for simultaneously moving the pistons of the struts to vary at will the volume of the compartment which is adjacent the movable wall.

WERNER F. BOLDT.